(12) United States Patent
Rai et al.

(10) Patent No.: US 12,039,554 B2
(45) Date of Patent: Jul. 16, 2024

(54) SYSTEMS AND METHODS FOR PROBABILISTIC PARTS FORECASTING BASED ON MACHINE UTILIZATION PATTERNS

(71) Applicant: Caterpillar Inc., Peoria, IL (US)

(72) Inventors: Prashant Rai, Champaign, IL (US); Sridhar Ramaswamy, Peoria, IL (US); Kyle J. Cline, Savoy, IL (US); Keith Atkinson, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 444 days.

(21) Appl. No.: 17/219,820

(22) Filed: Mar. 31, 2021

(65) Prior Publication Data
US 2022/0318829 A1 Oct. 6, 2022

(51) Int. Cl.
| | | |
|---|---|---|
| *G06Q 10/00* | (2023.01) | |
| *G06N 5/04* | (2023.01) | |
| *G06N 20/00* | (2019.01) | |
| *G06Q 30/0202* | (2023.01) | |
| *G06Q 30/0204* | (2023.01) | |

(52) U.S. Cl.
CPC ........... *G06Q 30/0202* (2013.01); *G06N 5/04* (2013.01); *G06N 20/00* (2019.01); *G06Q 30/0205* (2013.01)

(58) Field of Classification Search
None
See application file for complete search history.

(56) References Cited

U.S. PATENT DOCUMENTS

| | | | | |
|---|---|---|---|---|
| 6,810,362 | B2 * | 10/2004 | Adachi | E02F 9/26 702/183 |
| 7,664,671 | B2 * | 2/2010 | Shan | G06Q 30/0202 705/7.31 |
| 10,235,686 | B2 * | 3/2019 | Kohn | G06F 16/2219 |
| 10,922,650 | B2 * | 2/2021 | Wang | G06Q 10/0875 |

(Continued)

FOREIGN PATENT DOCUMENTS

CN          104951843 B          9/2015

OTHER PUBLICATIONS

"Getting to know probability distributions: Back-to-basics on data science fundamentals," Towards Data Science, Mar. 4, 2021; Cassie Kozyrkov (Year: 2021).*

(Continued)

*Primary Examiner* — Rutao Wu
*Assistant Examiner* — Scott M Ross

(57) ABSTRACT

A method for forecasting part sales, including collecting sales data for a part over a series of sales time periods and collecting activity data for a plurality of activity types over a series of activity time periods for a plurality of machines including the part. A mean activity time can be calculated for each activity type for each time period in the series of activity time periods based on the collected activity data. An activity probability density function of the mean activity times for each activity type is created and a machine learning model is trained using an expectation of activity derived from the probability density functions for each activity type and the collected sales data. Machine activity data for a set of machines can be fed into the trained model to derive a part sales probability density function for the set of machines.

17 Claims, 14 Drawing Sheets

(56) References Cited

U.S. PATENT DOCUMENTS

| | | | |
|---|---|---|---|
| 11,195,110 B2* | 12/2021 | Pouyllau | G06F 17/11 |
| 2003/0046191 A1* | 3/2003 | Ferreri | G06Q 10/06 |
| | | | 700/106 |
| 2015/0371243 A1* | 12/2015 | Ramaswamy | G06Q 30/0202 |
| | | | 705/7.31 |
| 2016/0094425 A1 | 3/2016 | Schulz | |
| 2019/0122144 A1* | 4/2019 | Kabeya | H04L 63/1408 |
| 2020/0104793 A1* | 4/2020 | Wang | G06Q 30/0202 |
| 2020/0126167 A1* | 4/2020 | Meerkov | G06Q 10/06393 |
| 2020/0302540 A1* | 9/2020 | Xiu | G06F 40/30 |
| 2021/0168019 A1* | 6/2021 | Qingsong | H04L 41/064 |
| 2022/0318829 A1* | 10/2022 | Rai | G06Q 30/0205 |

OTHER PUBLICATIONS

Alexanderian, A., Gremaud, P.A., Smith, R.C.: Variance-based sensitivity analysis for time-dependent processes. Reliab. Eng. Syst. Saf. 196, 106722 (2020), (Year: 2020).*

See "Continuous Probability Distributions for Machine Learning"; Machine Learning Mastery; by Jason Brownlee on Sep. 25, 2019 (Year: 2019).*

* cited by examiner

SYSTEMS AND METHODS FOR PROBABILISTIC PARTS FORECASTING BASED ON MACHINE UTILIZATION PATTERNS

TECHNICAL FIELD

This patent application is directed to sales forecasting, and more specifically, to forecasting sales of equipment replacement parts.

BACKGROUND

Accurate sales forecasting for equipment replacement parts is an important business problem since optimal allocation of resources for faster delivery and servicing can help avoid machine downtime, thereby improving customer satisfaction.

Replacement part sales forecasting is also useful for estimating capital costs involved in manufacturing and storage of parts by geographic region. Conventional sales forecasting is typically based solely on time series analysis of historical part sales data.

Efforts have been made to more accurately forecast sales for equipment replacement parts. For example, U.S. Patent Application Publication No. 2015/0371243 to Ramaswamy et al., (hereinafter "Ramaswamy") describes a method of part sales forecasting based on rudimentary telematics data (e.g., service meter hours, fuel consumption, or idle hours) and econometrics data (e.g., regional economic outlook). The method includes generating a group of candidate predictors from historical telematics data and historical econometrics data, selecting predictors from the group of candidate predictors, and establish a forecasting model representing a relationship between the selected predictors and historical sales data for a particular part.

Ramaswamy bases part sales forecasting on basic information such as service hours and fuel consumption but has no capability to determine what activities (e.g., excavation, grading, or traveling) the equipment is performing. Furthermore, Ramaswamy does not provide insights into the sales forecast such as accuracy and sensitivity to activity type.

Thus, there are still opportunities to improve on the accuracy of sales forecasting for equipment replacement parts. The example systems and methods described herein are directed toward overcoming one or more of the deficiencies described above and/or other problems with the prior art.

SUMMARY

In some embodiments, a method for forecasting part sales can include collecting sales data for a part over a series of sales time periods and collecting activity data for a plurality of activity types over a series of activity time periods for a plurality of machines including the part. A mean activity time can be calculated for each activity type for each time period in the series of activity time periods based on the collected activity data. An activity probability density function of the mean activity times for each activity type can be created and a machine learning model is trained using an expectation of activity derived from the probability density functions for each activity type and the collected sales data. Machine activity data for a set of machines can be fed into the trained model to derive a part sales probability density function for the set of machines.

In some aspects, the set of machines can correspond to a geographic area. According to some aspects, the method can further comprise distributing a quantity of the part to the geographic area based on the part sales probability density function for the set of machines. In further aspects, the sales time periods are months and the activity time periods are months. In some aspects, the method can further comprise calculating the model's accuracy and the model's sensitivity of parts sales with respect to each activity type. In some aspects, calculating the model's sensitivity of parts sales with respect to each activity type comprises performing a Sobol sensitivity analysis to model the normalized variance of the conditional expectation of part sales with respect to each activity type. According to some aspects, the machine learning model comprises linear regression with sparse regularization. In some aspects, collecting the activity data comprises receiving telematics data from a plurality of sensors on each of the plurality of machines and determining one or more activity types for each machine based on the associated telematics data.

In some embodiments, a part distribution system can include one or more processors and one or more memory devices having stored thereon. When executed by the one or more processors the instructions cause the one or more processors to collect sales data for a part over a series of sales time periods and receive telematics data from a plurality of sensors on each of a plurality of machines including the part. The instructions can cause the one or more processors to determine one or more activity types for each machine over a series of activity time periods based on the associated telematics data and calculate a mean activity time for each activity type for each time period in the series of activity time periods for the plurality of machines. The instructions can also cause the one or more processors to create an activity probability density function of the mean activity times for each activity type and train a machine learning model using an expectation of activity derived from the activity probability density functions for each activity type and the collected sales data. Machine activity data for a set of machines located in a geographic area can be fed into the trained model to derive a part sales probability density function for the set of machines. The instructions can also cause the one or more processors to send instructions to distribute a quantity of the part to the geographic area based on the part sales probability density function for the set of machines.

In some aspects, the sales time periods are months and the activity time periods are months. According to some aspects the system can further comprise calculating the model's accuracy and the model's sensitivity of parts sales with respect to each activity type. In further aspects, the machine learning model comprises linear regression with sparse regularization.

In some embodiments, one or more non-transitory computer-readable media storing computer-executable instructions that, when executed by one or more processors, cause the one or more processors to perform operations. The operations can include collecting sales data for a part over a series of sales time periods and collecting activity data for a plurality of activity types over a series of activity time periods for a plurality of machines including the part. The operations can also include calculating a mean activity time for each activity type for each time period in the series of activity time periods based on the collected activity data. The operations can further include creating an activity probability density function of the mean activity times for each activity type and training a machine learning model using an expectation of activity derived from the activity probability density functions for each activity type and the collected sales data. The operations can include feeding machine activity data for a set of machines into the trained model to derive a part sales probability density function for the set of machines.

In some aspects, the set of machines corresponds to a geographic area. According to some aspects, the computer-readable media can further comprise instructions to direct distribution of a quantity of the part to the geographic area based on the part sales probability density function for the set of machines. In some aspects, the sales time periods are months and the activity time periods are months. According to some aspects, the computer-readable media can further comprise instructions to calculate the model's accuracy and the model's sensitivity of parts sales with respect to each activity type. In some aspects, calculating the model's sensitivity of parts sales with respect to each activity type comprises performing a Sobol sensitivity analysis to model the normalized variance of the conditional expectation of part sales with respect to each activity type. In some aspects, the machine learning model comprises linear regression with sparse regularization. In some aspects, collecting the activity data comprises receiving telematics data from a plurality of sensors on each of the plurality of machines and determining one or more activity types for each machine based on the associated telematics data.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
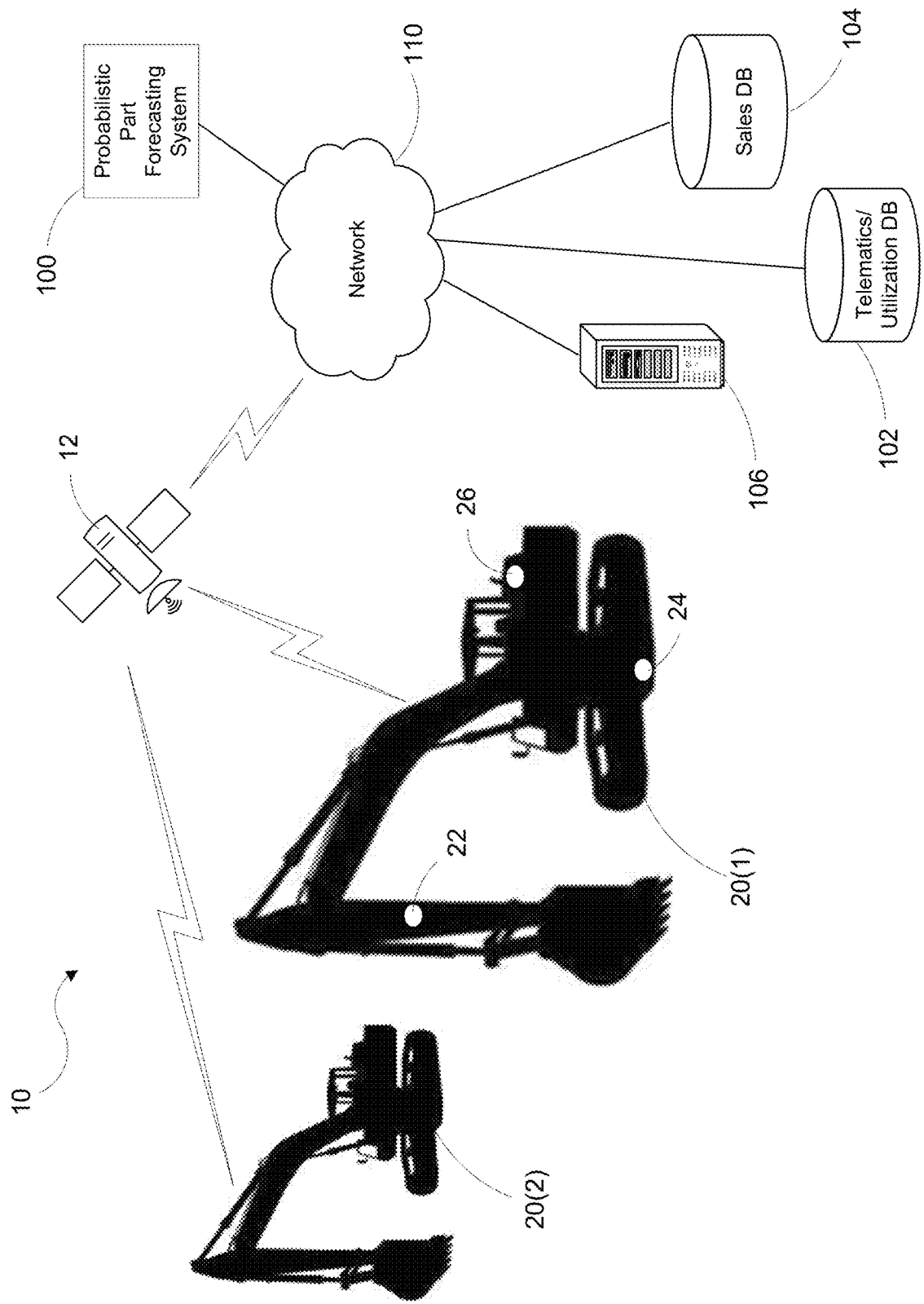
FIG. 1 is a diagram illustrating an overview of an environment in which some implementations can operate according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

Disclosed are methods and systems for probabilistic forecasting of parts sales based on utilization patterns of machines in order to provide proactive after sales services, for example. The disclosed technology makes use of both historical part sales data and machine utilization data for forecasting by modeling their causal relationship. The disclosed technology explicitly models the uncertainty in the forecasted results based on suitable probabilistic machine learning techniques, thereby modeling risk in the predictions. The disclosed technology is based on collecting, aggregating, and normalizing the appropriate time series data followed by probabilistic modeling of parts sales informed by historical utilization patterns of machines. The model then makes predictions with quantifiable risk estimates and qualitative insight about the dependence of parts sales on different application types, thus helping to make informed business decisions.

FIG. 1 illustrates an environment 10 in which some implementations of the probabilistic part forecasting system 100 can operate according to embodiments of the disclosed technology. The system environment 10 can include multiple machines, such as excavators 20(1) and 20(2), a satellite 12, telematics/utilization database 102, a sales database 104, a telematics processing system 106, and a network 110. The probabilistic part forecasting system 100 can be connected to the telematics/utilization database 102, the sales database 104, and the telematics processing system 106 via network 110. The telematics/utilization database 102 and the telematics processing system 106 can receive telematics data from the excavators 20(1) and 20(2) via satellite 12. The telematics data can include sensor data from the excavators, such as from a pressure sensor 22, a vibration sensor 24, and a temperature sensor 26, to name a few.

In some embodiments, the telematics processing system 106 determines a machine utilization pattern for the machines based on the telematics data. For example, a machine learning model (such as a neural network) can be applied to estimate each machine's utilization pattern based on telematics data (i.e., telemetry data). As an example, an excavator can have a use pattern of activities including 50% mass excavation, 20% grading, and 30% tracking (i.e., traveling from place to place).

In some embodiments, a utilization model can use mathematical models that classify equipment activity or application frequencies, which can include regression, support vector machines, and neural nets, depending on the level of detail and complexity required. These models may differentiate between, for example, mass excavation, dirt moving, trenching, scraping, grading, loading, tracking, or idle time. Models may supplement standard telematics data with additional sensors to measure the intensity of use. The resulting machine utilization patterns, or activity data, can be provided to the probabilistic part forecasting system 100, along with corresponding sales data, to calculate a probabilistic part forecast based on the activity data for a particular part of interest.

Figure 2:
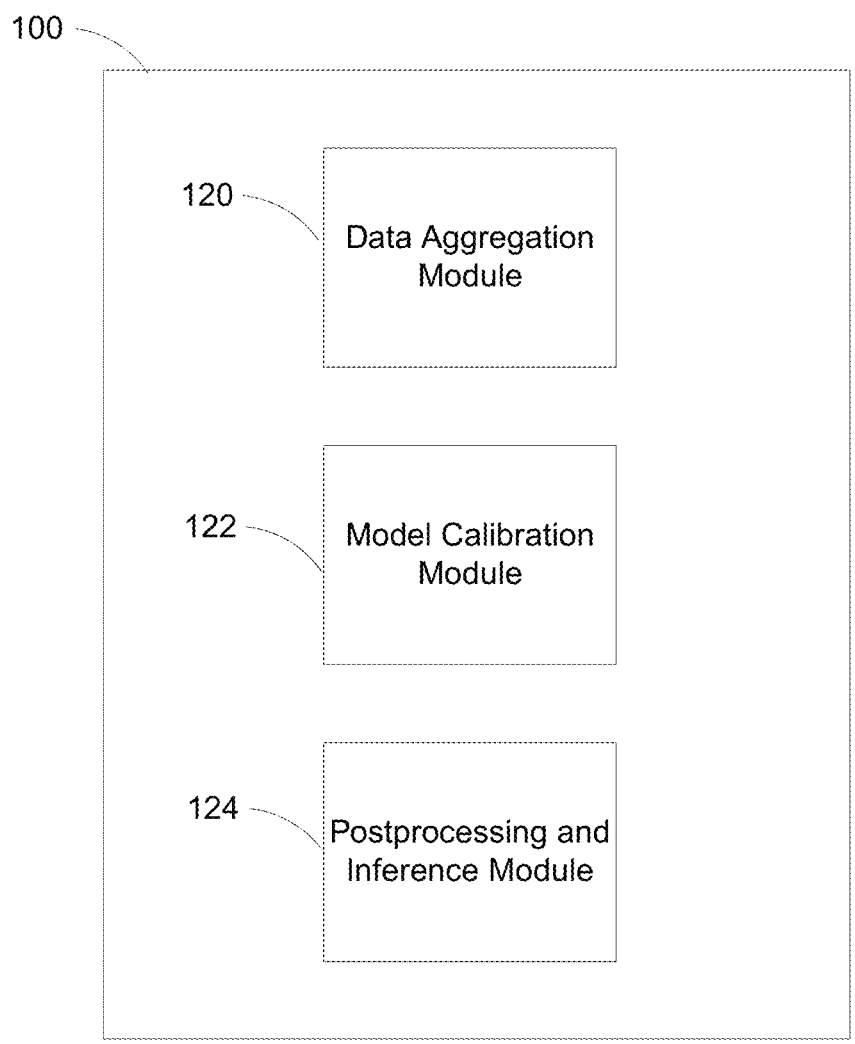
FIG. 2 is a block diagram illustrating an overview of a probabilistic part forecasting system according to some embodiments of the disclosed technology.

As shown in FIG. 2, the probabilistic part forecasting system 100 can comprise a data aggregation module 120, a model calibration module 122, and a postprocessing and inference module 124. The data aggregation module 120 can comprise methods to aggregate data from multiple sources for modeling the causal relationship of parts sales to the utilization pattern of machines. Appropriate design decisions include choosing the right data sources, aggregating the data at an appropriate scale, identifying parts to be forecasted at the right level of hierarchy, and connecting historical machine utilization data to part sales data. The model calibration module 122 can comprise components involved in building a machine learning model, including feature extraction and feature engineering, probabilistic modeling of features, and efficient estimation of parameters of the machine learning model. The postprocessing and inference module 124 can comprise a set of integrated tools to postprocess the output of learning obtained from model calibration and derive conclusions relevant for making supply chain and business decisions.

The data aggregation module 120 can identify relevant data sources for historical parts sales. Depending on the structure of the organization, part sales information may be distributed across several business units or a business unit that manages after sales services. Measures of historical parts sales may be available directly or indirectly. For example, a direct measure is time series of actual number of units of a part type sold whereas an indirect measure is the time series of invoices of a part type generated over the observation duration.

The data aggregation module 120 also identifies part type of interest. Depending on the availability and granularity of parts data, one may first identify a specific part from a collection of parts for which the forecasting study is to be performed. Typically, in engineering products, parts are organized in a hierarchical structure, i.e., each part belongs to a subgroup (e.g., engine, transmission) which itself may contain several sub-parts. Identification of a part or a collection of parts to be forecasted at the right level of hierarchy is usually a function of the time period over which both historical part sales and machine utilization data is available.

The data aggregation module 120 also identifies relevant machine utilization pattern, or activity data. Data on machine utilization patterns includes the knowledge of distribution of specific machine activities over an observed duration. This information for a machine is obtained by running a classification model that maps sensor data to specific activity labels. Certain activities are more intensive and affect sales of specific parts more than others. It can be reasoned that this distribution of activities for all machines in a geographical region of interest directly affects parts wear and/or failure. It is therefore a causal factor that can be used to model part sales at a future time.

Figure 3:
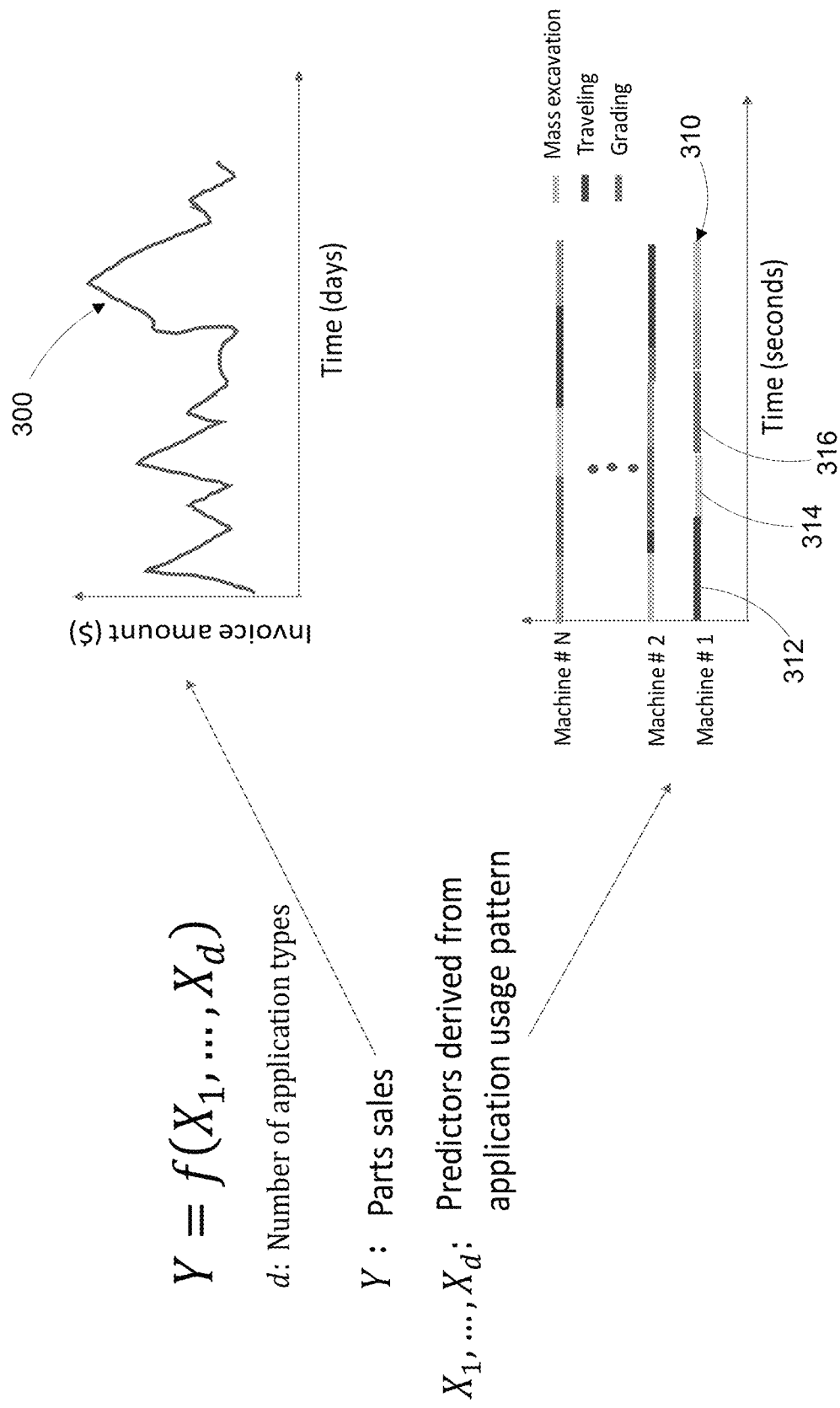
FIG. 3 is a diagram illustrating part sales as a function of machine utilization activities.

With reference to FIG. 3, in some embodiments, part sales Y can be modeled as a function of predictors X derived from application usage patterns of machines 1 to N, for example. Part sales data 300 can be in the form of invoice amount ($) for each day. For each machine 1 to N, telematics data can be used to determine a machine utilization pattern 310. Each machine utilization pattern 310 can include segments representing different activities, such as a traveling segment 312, a mass excavation segment 314, and a grading segment 316, for example. In some embodiments, the activities are measured in seconds, for example.

Part sales and machine utilization pattern timeseries may be available at different time scales. For example, part sales data may be available daily whereas machine utilization data may be available once for every few seconds. Thus, in some embodiments, an aggregation procedure is used to bring the two datasets to the same time scale. The scale of aggregated data depends on the required forecasting time scale, typically, month(s). Since the number of connected assets (e.g., machines) can increase over time, in some embodiments, the parts sales time series is normalized with the number of machines in the region of interest.

Figure 4:
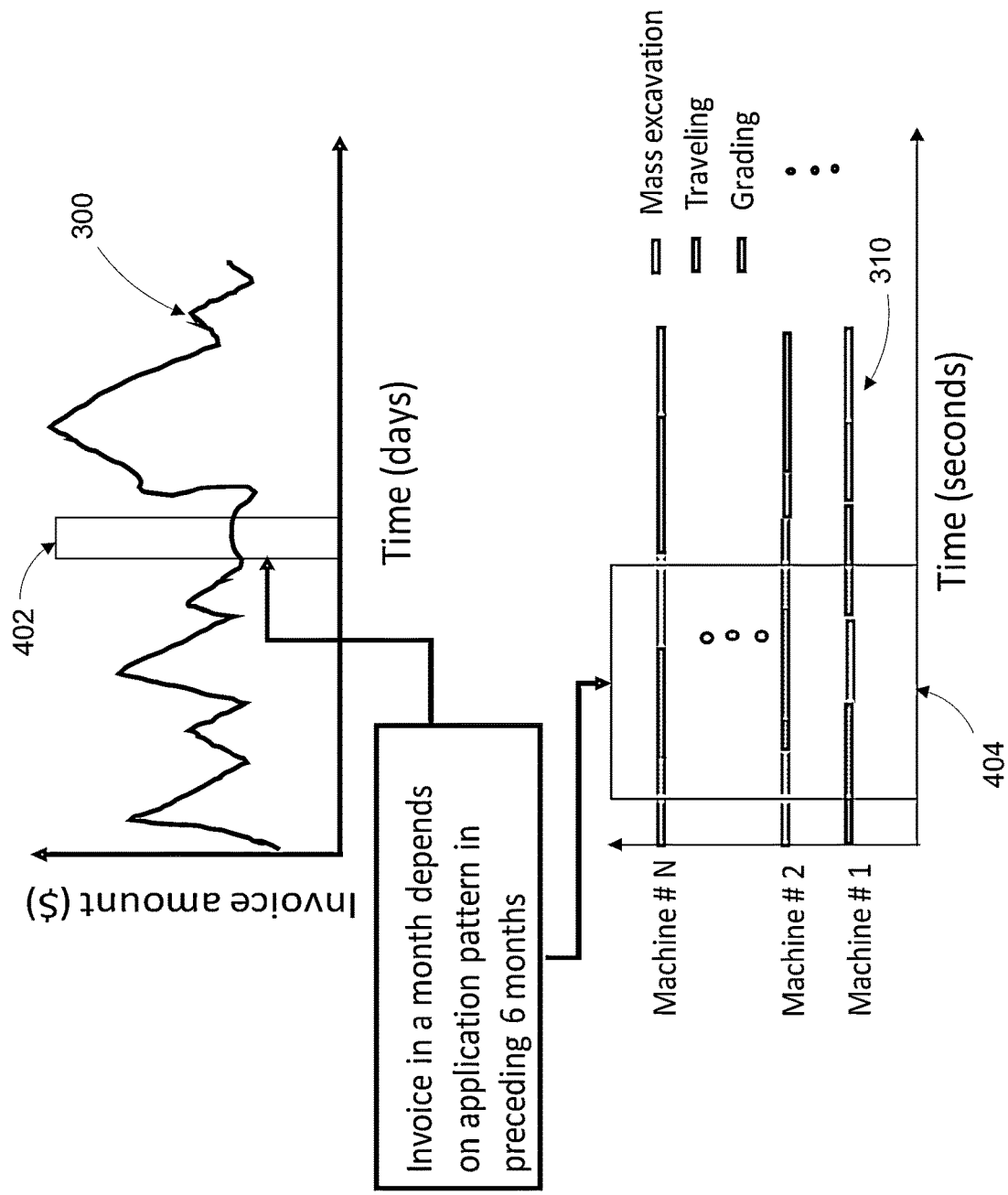
FIG. 4 is a diagram illustrating the relationship of parts sales time series to historical machine utilization time series.

FIG. 4 illustrates an example relationship of parts sales time series 300 to historical machine utilization pattern time series 310. The invoice dollar amount for a part in a given one-month sales time period 402 depends on the activity types in the machine utilization pattern 310 over an activity time period 404 comprising e.g., the preceding six months.

Figure 5:
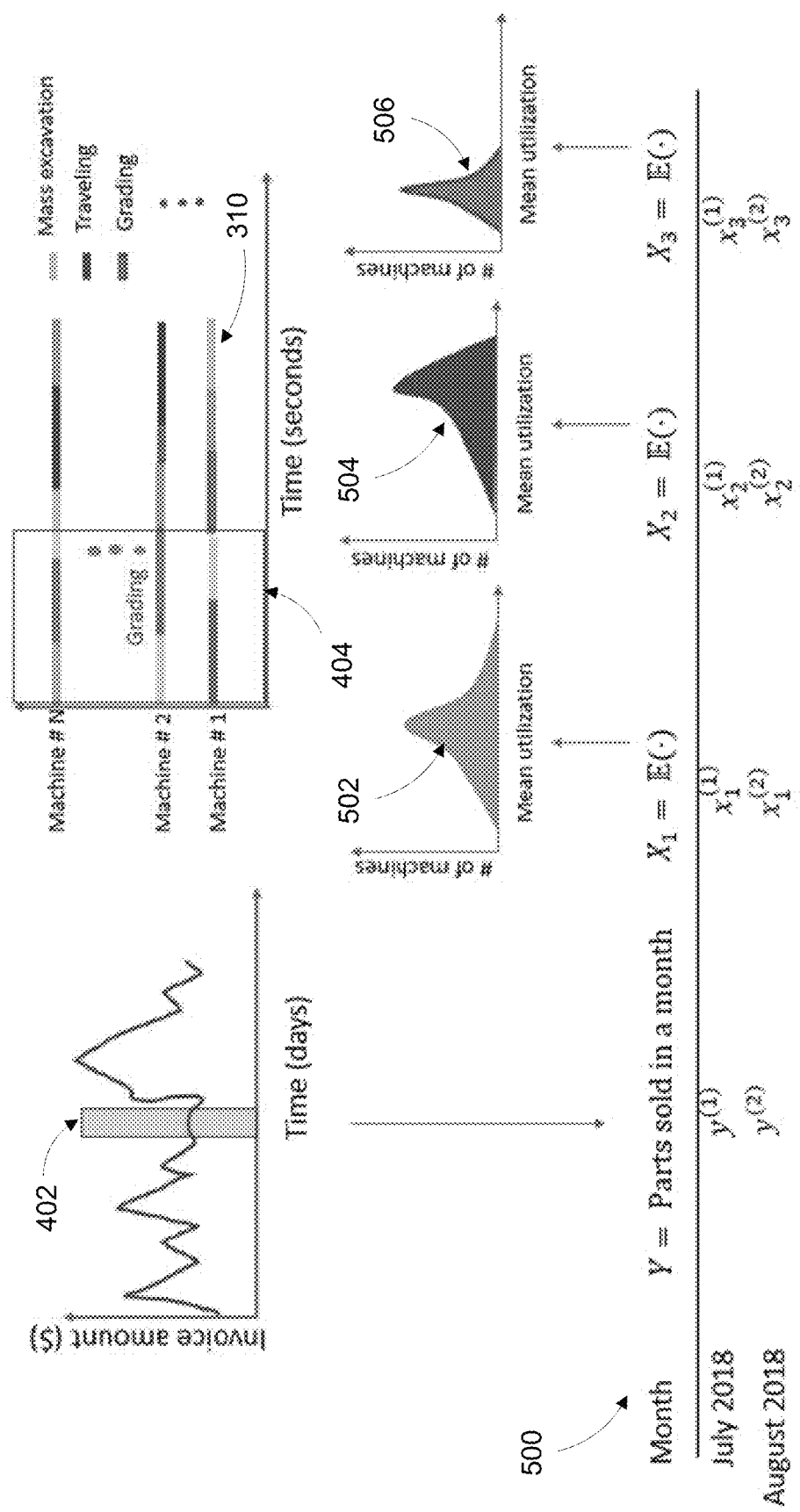
FIG. 5 is a diagram illustrating the preparation of data for fitting a machine learning model.

With further reference to FIG. 5, given the machine utilization pattern data 310 for a sample of machines (e.g., machines 1 to N), a distribution (i.e., histogram) can be created for each activity type for each activity time period 404 (e.g., preceding six months) corresponding to a one-month sales time period 402. For example, distribution 502 represents the distribution of time that each machine spends on mass excavation over time period 404. Distribution 504 represents the distribution of time that each machines spends on traveling and distribution 506 represents the distribution of time that each machine spends on grading over time period 404.

In the model calibration module 122 a machine learning model can be constructed that captures the dependence of parts sales as a function of features derived from the machine utilization distributions (e.g., distributions 502, 504, 506). The model uses information or features that can be derived from these historical machine utilization distributions, such as moment features (e.g., mean, standard deviation, skewness, kurtosis). The number of moment features selected for each distribution depends on the number of data points for parts and machine utilization time series available. If sufficient data is available, all moment features can be included as predictors. The total number of predictors is this number of moments times the number of application types. In the example shown in FIG. 5, the mean of each distribution (e.g., distributions 502, 504, 506) is the selected moment feature. Thus, chart 500 illustrates that for each month (e.g., July 2018 and August 2018) of sales data y there is corresponding mean activity time x for each activity type. For example, for July 2008 there was $y^{(1)}$ parts sold that month and, in the preceding six months, the mean activity duration for mass excavation was $x_1^{(1)}$, the mean activity duration for traveling was $x_2^{(1)}$, and the mean activity duration for grading was $x_3^{(1)}$.

Figure 6:
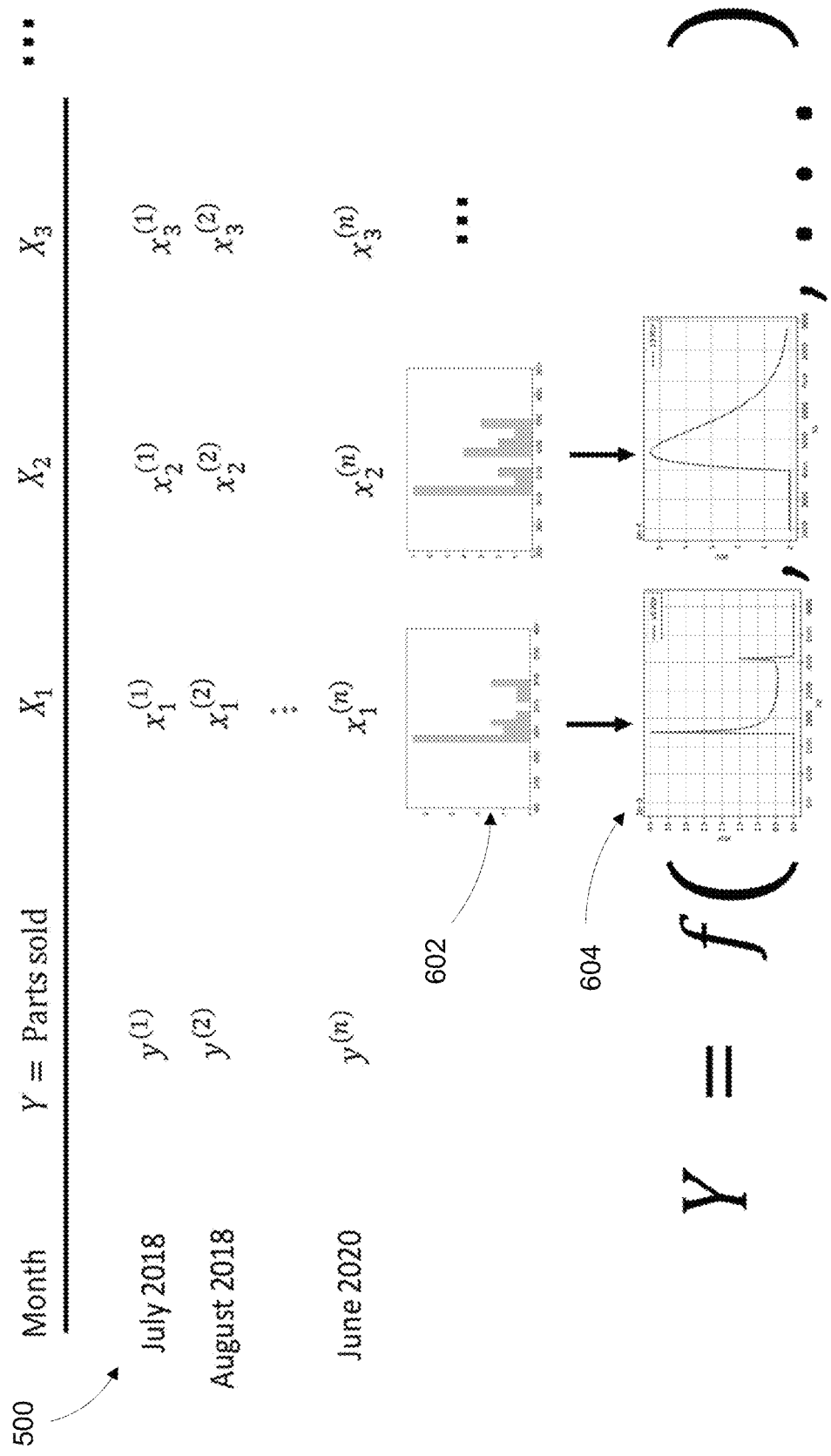
FIG. 6 is a diagram illustrating modeling histogram features as random variables with appropriate distributions.

Once the features of the model are determined, the uncertainty in the part sales predictions are modeled. This step is significant as the features are derived from distributions of application usage patterns which themselves are obtained from a machine learning model. Therefore, the features are modeled as random variables with appropriate distribution. As shown in FIG. 6, the features are modeled as random variables by creating a histogram 602 of e.g., mean activity durations for each activity type over time. A probability distribution function 604 is then fit to each histogram 602. The random variables model uncertainty in the features which can then be propagated through the model to determine the uncertainty in the sales predictions. The distribution of features modeled as random variables informs the choice of basis functions in the regression model below.

Figure 7:
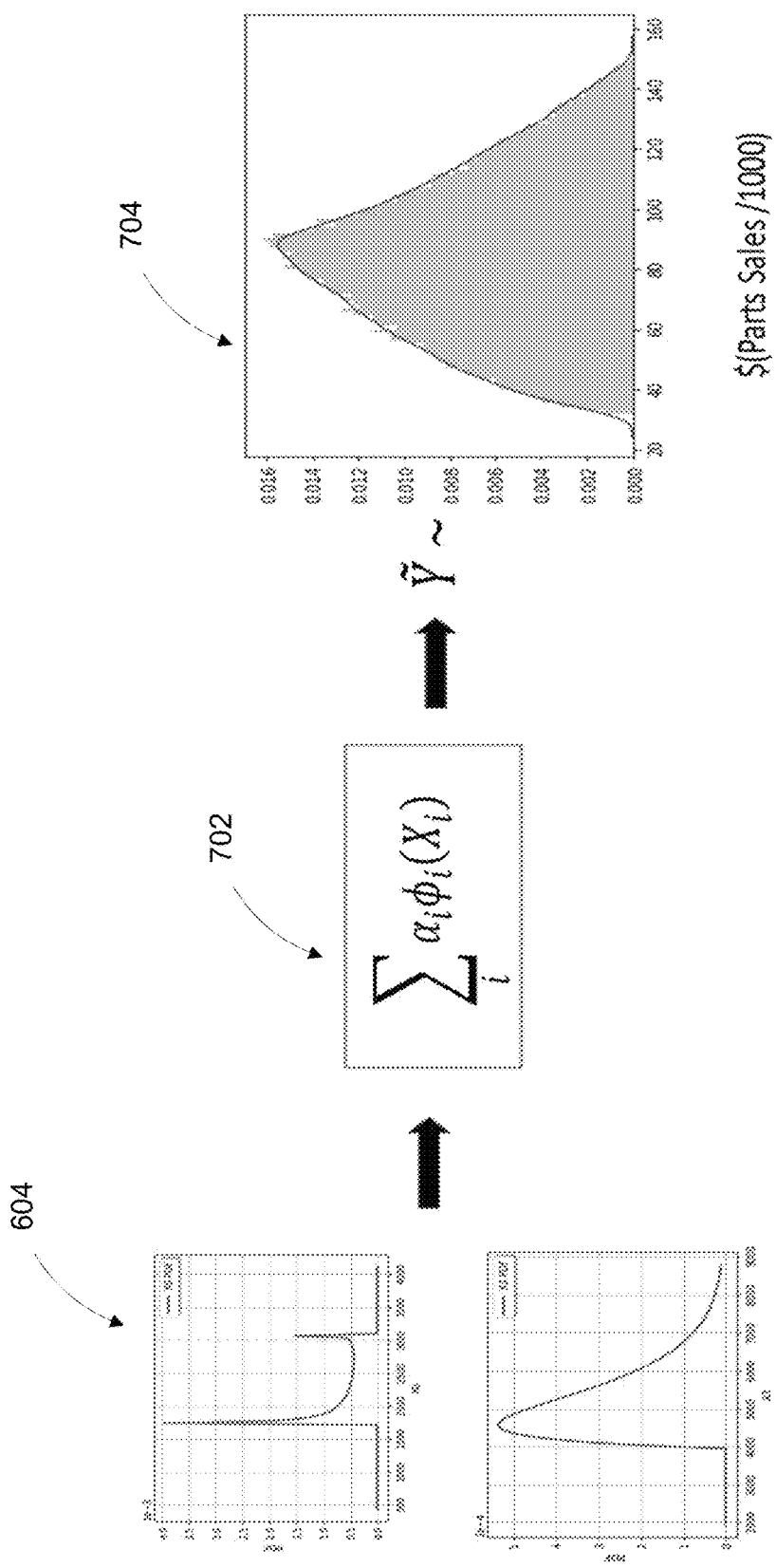
FIG. 7 is a diagram illustrating linear regression for modeling the dependence of parts sales on features.

FIG. 7 Illustrates part sales 704 as a linear function 702 of mean application duration random variables 604. The part sales output 704 is also a random variable whose probability density function can be estimated, thereby capturing the uncertainty in the features. In some embodiments, linear regression can be used to model the dependence of parts sales on the selected features. The system can use least squares approximation with sparsity constraints to determine regression coefficients on appropriate basis functions. These basis functions are usually polynomial transformations of features. These polynomials are chosen such that they are orthogonal to probability density functions of the random variables modeling uncertainty in the features. The accuracy of regression can be enhanced by using sparsity based regularization, especially when fewer data points as compared to the number of basis functions are available.

Figure 8:
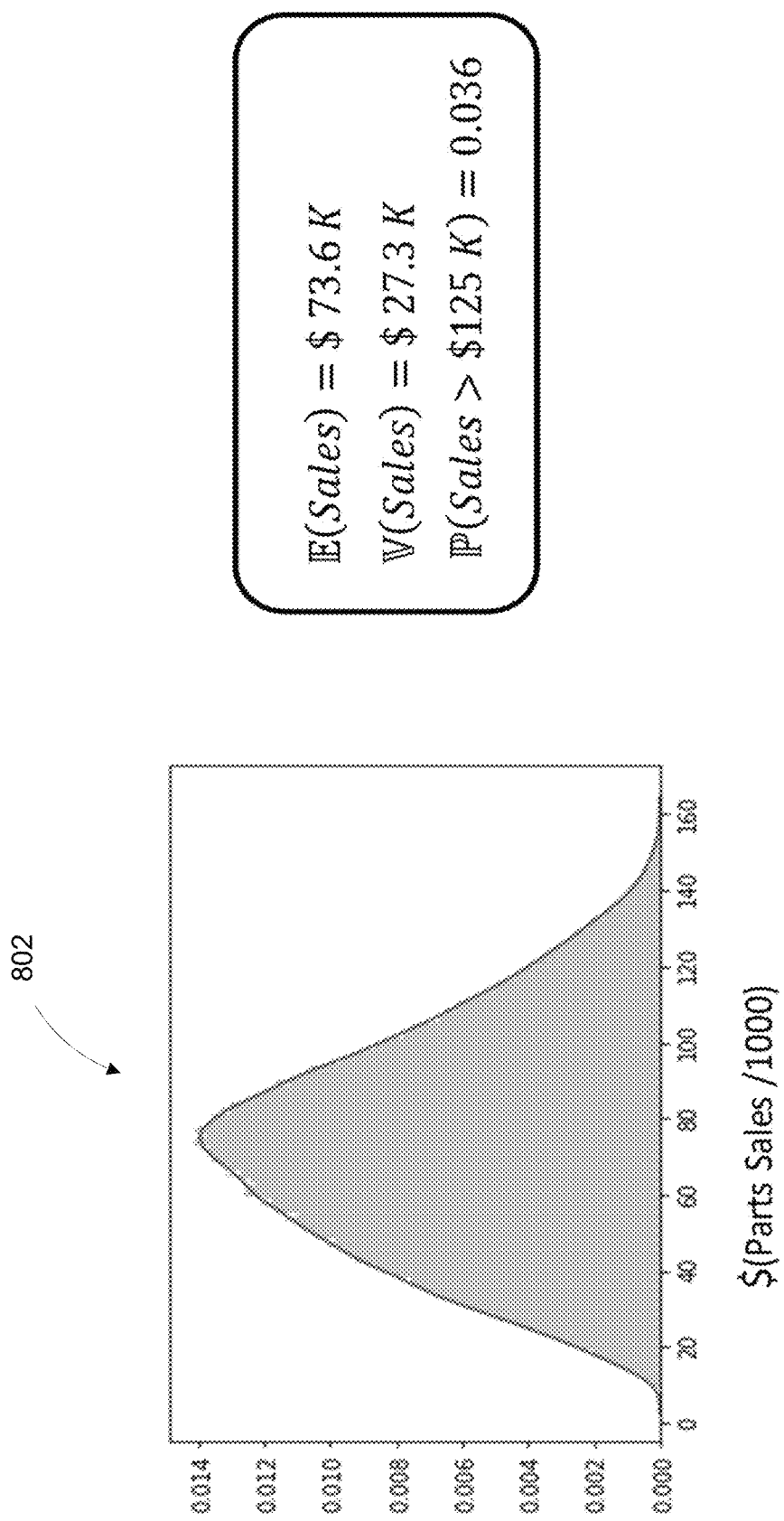
FIG. 8 is a diagram illustrating a representative forecast output as a random variable capturing uncertainty in features.

FIG. 8 illustrates an example probability density function 802 for random variable modeling of pumps and motors sales. In this example, the expected sales E is $73.6K, the variance in sales V is $27.3K, and the probability P that sales exceeds $125K is 0.036.

Figure 9:
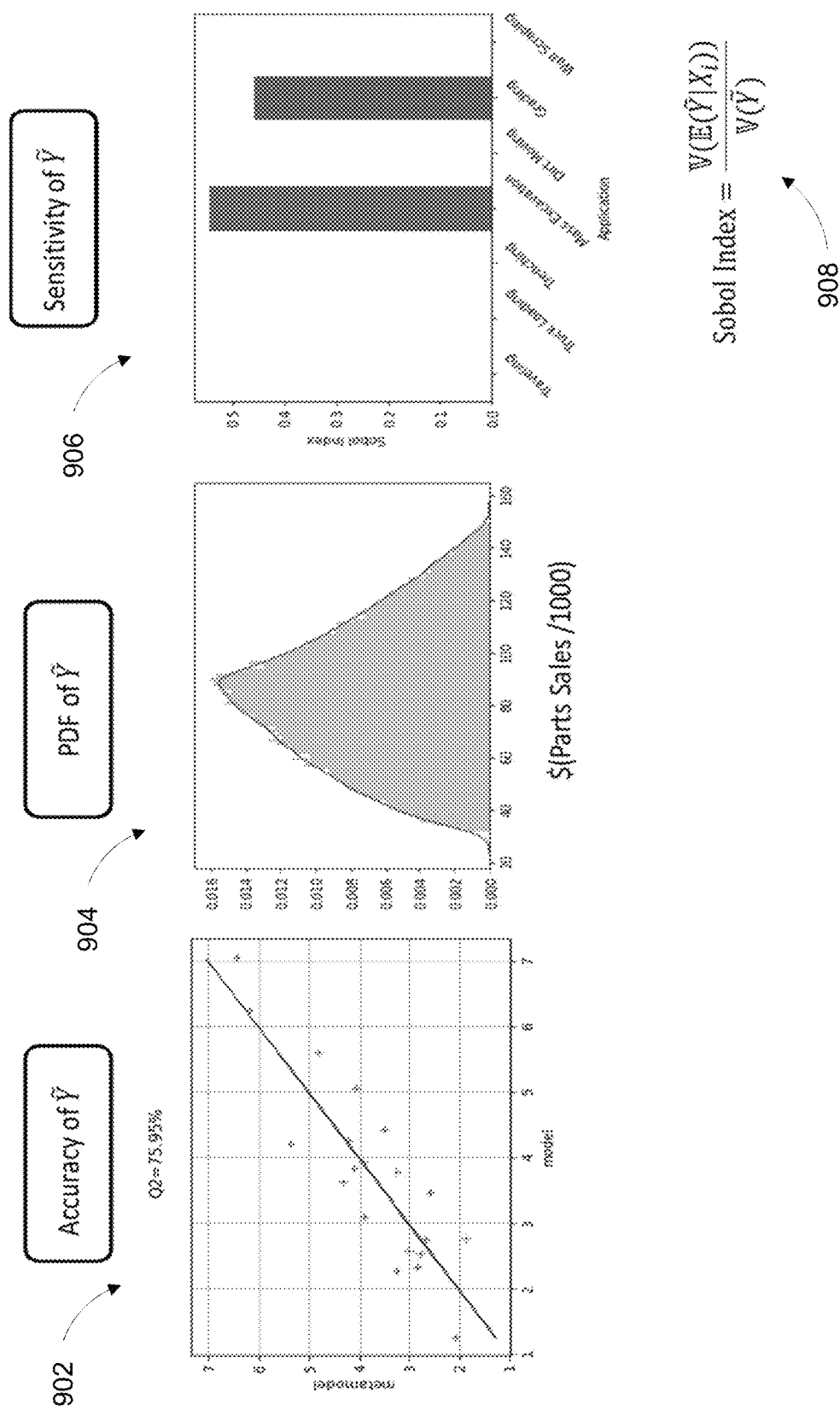
FIG. 9 is a diagram illustrating representative forecast results for hydraulic cylinders and components.

FIG. 9 is a diagram illustrating representative forecast results for hydraulic cylinders and components. In the post-processing module 124, the system can determine the accuracy of the approximation 902, the probability density function of future part sales 904, and the sensitivity of parts sales with respect to machine application or activity type 906. The system can determine the accuracy of the approximation model 902 on a separate test set. However, in practice, if sufficient data is not available, the system can determine the accuracy based on k-fold cross validation keeping in mind that this is usually an optimistic error estimate.

With the meta-model relating parts sales to utilization pattern, the system can estimate the probability density of part sales 904 through sampling the distribution. This approach can therefore give quantitative risk estimates on the sales prediction. The system can calculate the sensitivity of parts sales with respect to each application type 906 by performing a sensitivity analysis. The system can therefore perform Sobol sensitivity analysis 908 to model the normalized variance of the conditional expectation of part sales with respect to each application type. For example, the forecast results for hydraulic cylinders and components is sensitive to mass excavation and grading applications. This analysis provides both qualitative and quantitative dependence of part sales on each application type thus providing valuable insight. This information can be used in, for example, developing variable time warranty offers based on historical machine usage, estimating capital costs involved in manufacturing, and storage of parts by geographic region.

Figure 10:
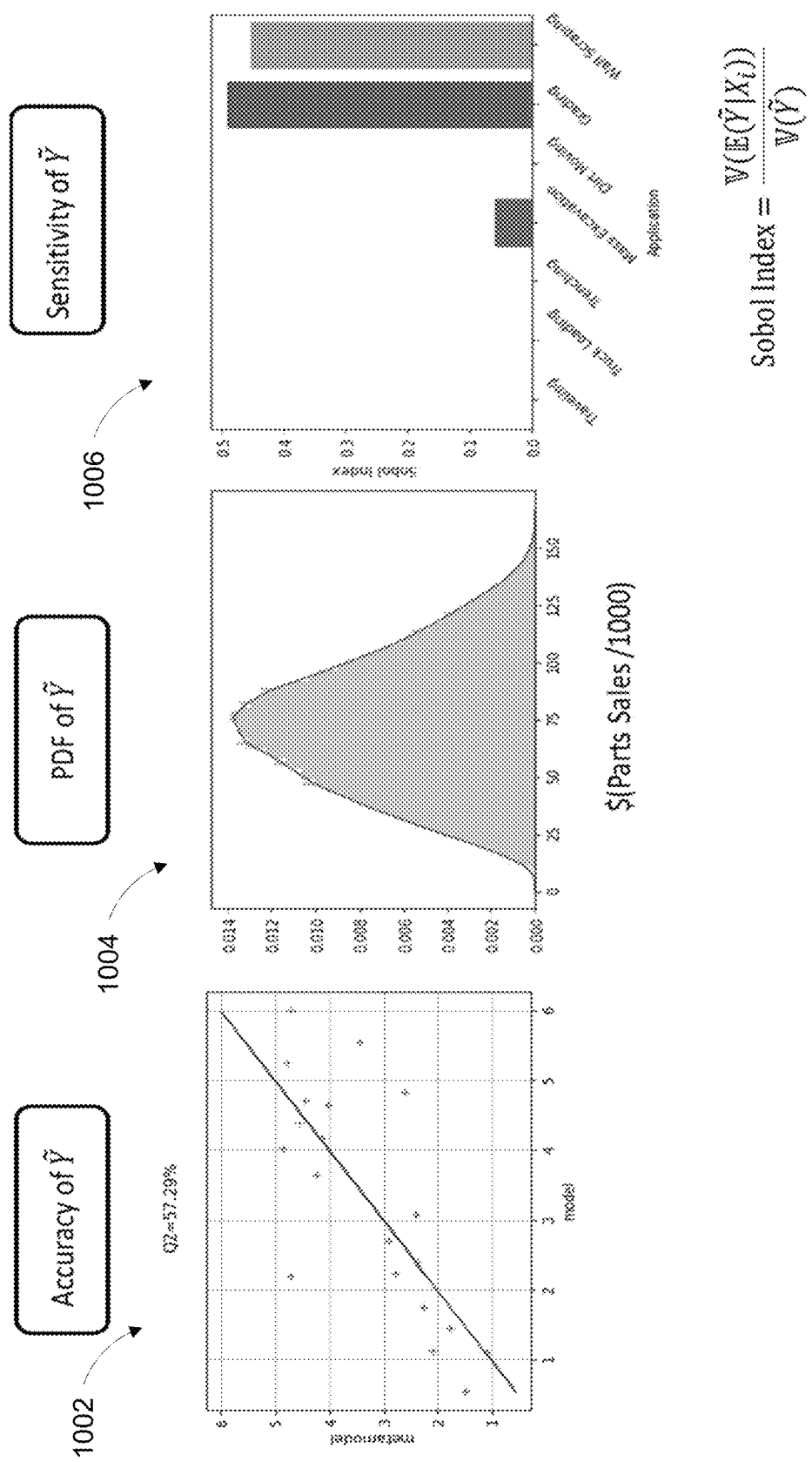
FIG. 10 is a diagram illustrating representative forecast results for pumps and motors.

As another example, FIG. 10 illustrates representative part sales forecast results for pumps and motors, including the accuracy of the approximation 1002, the probability density function of future part sales 1004, and the sensitivity of parts sales with respect to machine application or activity type 1006. In this example, the forecast results for pumps and motors is sensitive to grading and wall scraping applications, and to a lesser extent, mass excavation.

Figure 11:
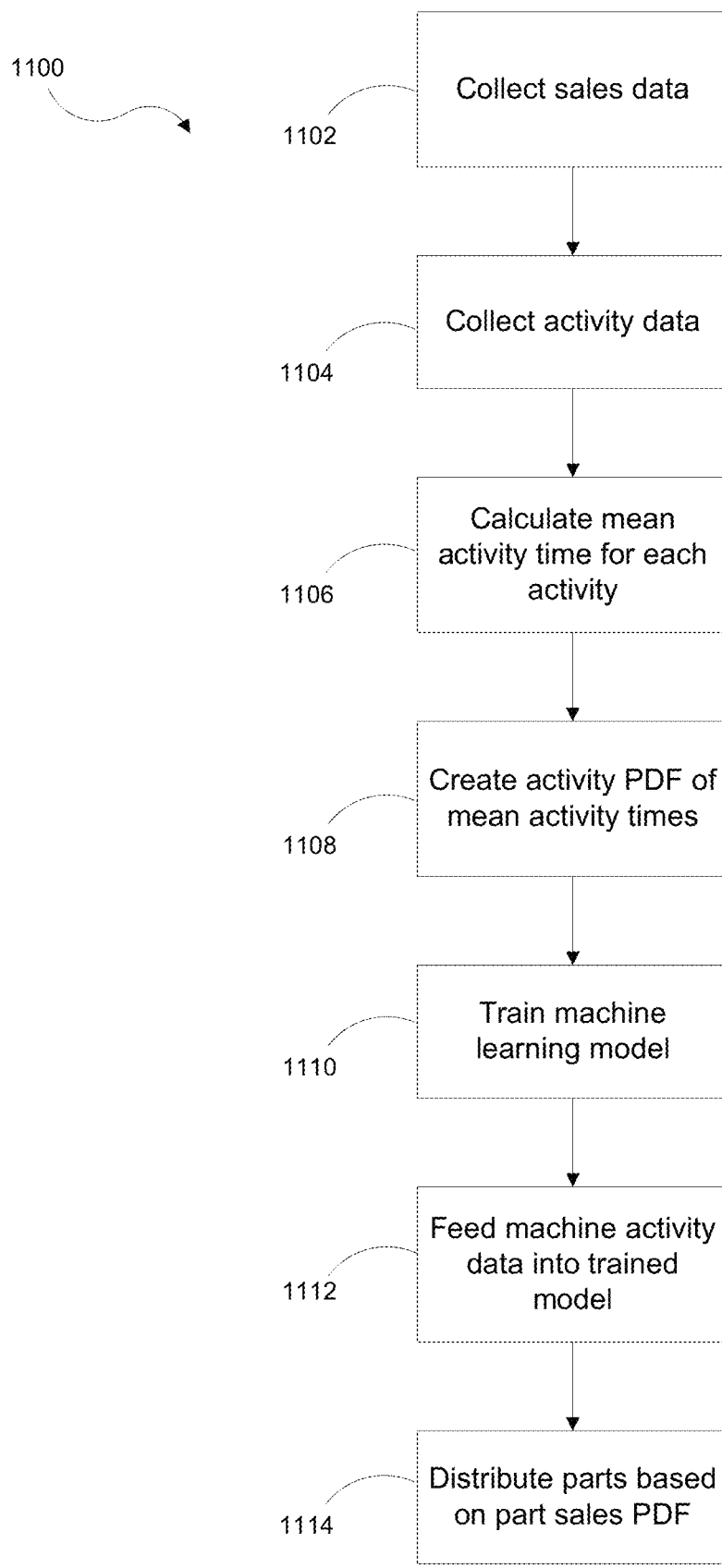
FIG. 11 is a flow diagram showing a method for probabilistic part sales forecasting according to some embodiments of the disclosed technology.

FIG. 11 is a flow diagram showing a method 1100 for forecasting part sales according to some embodiments of the disclosed technology. The method 1100 can include collecting sales data for a part over a series of sales time periods at step 1102 and collecting activity data for a plurality of activity types over a series of activity time periods for a plurality of machines including the part at step 1104. The method can include calculating a mean activity time for each activity type for each time period in the series of activity time periods based on the collected activity data at step 1106. The method further includes creating an activity probability density function of the mean activity times for each activity type at step 1108 and training a machine learning model using an expectation of activity derived from the probability density functions for each activity type and the collected sales data at step 1110. At step 1112, machine activity data for a set of machines can be fed into the trained model to derive a part sales probability density function for the set of machines. At step 1114, a quantity of the part can be distributed to the geographic area of the machines based on the part sales probability density function for the set of machines.

Suitable System

The techniques disclosed here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 12:
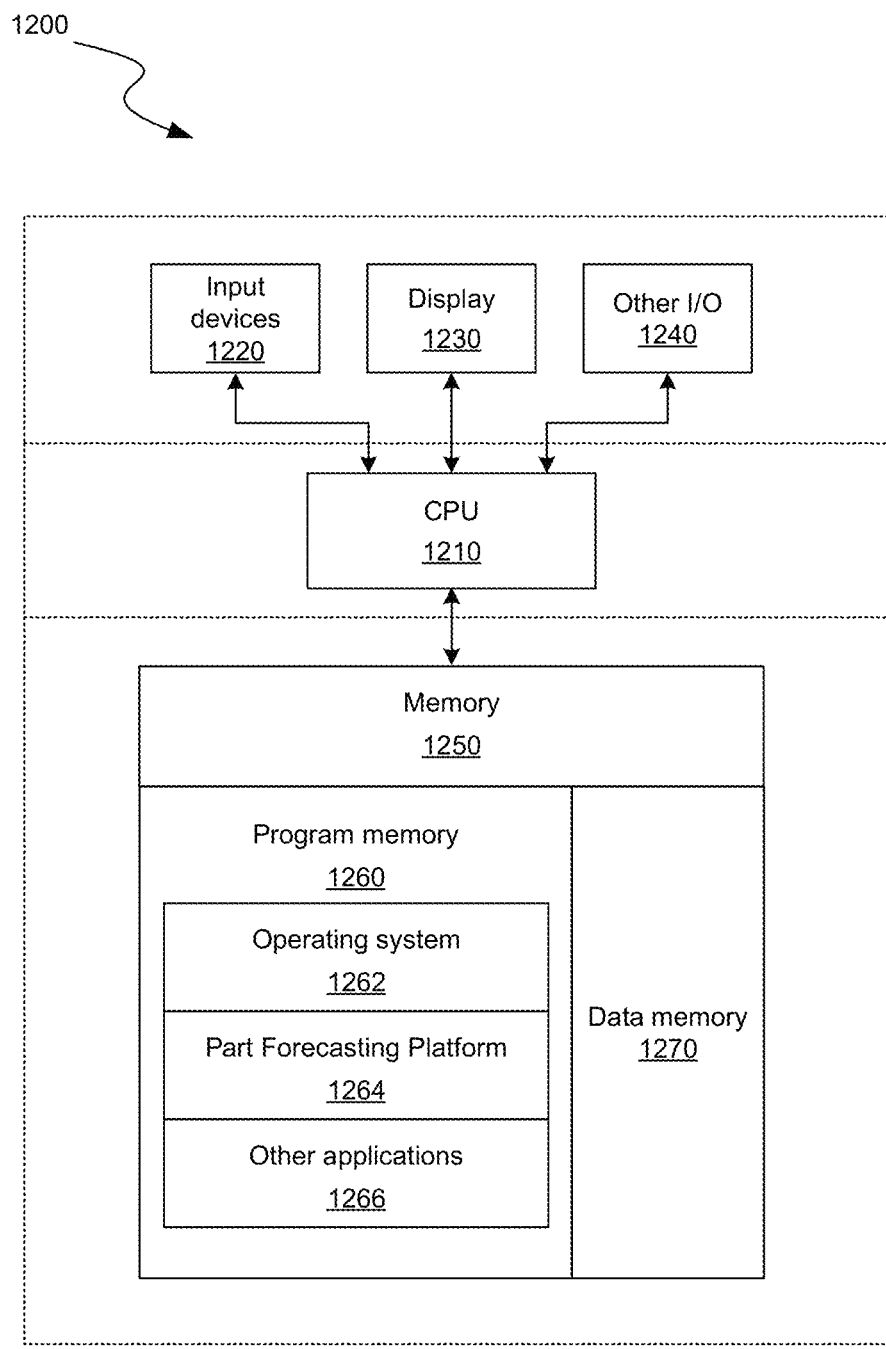
FIG. 12 is a block diagram illustrating an overview of devices on which some implementations can operate.

Several implementations are discussed below in more detail in reference to the figures. FIG. 12 is a block diagram illustrating an overview of devices on which some implementations of the disclosed technology can operate. The devices can comprise hardware components of a device 1200 that performs object identification, for example. Device 1200 can include one or more input devices 1220 that provide input to the CPU (processor) 1210, notifying it of actions. The actions are typically mediated by a hardware controller that interprets the signals received from the input device and communicates the information to the CPU 1210 using a communication protocol. Input devices 1220 include, for example, a mouse, a keyboard, a touchscreen, an infrared sensor, a touchpad, a wearable input device, a camera- or image-based input device, a microphone, or other user input devices.

CPU 1210 can be a single processing unit or multiple processing units in a device or distributed across multiple devices. CPU 1210 can be coupled to other hardware devices, for example, with the use of a bus, such as a PCI bus or SCSI bus. The CPU 1210 can communicate with a hardware controller for devices, such as for a display 1230. Display 1230 can be used to display text and graphics. In some examples, display 1230 provides graphical and textual visual feedback to a user. In some implementations, display 1230 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 1240 can also be coupled to the processor, such as a network card, video card, audio card, USB, FireWire or other external device, sensor, camera, printer, speakers, CD-ROM drive, DVD drive, disk drive, or Blu-Ray device.

In some implementations, the device 1200 also includes a communication device capable of communicating wirelessly or wire-based with a network node. The communication device can communicate with another device or a server through a network using, for example, TCP/IP protocols. Device 1200 can utilize the communication device to distribute operations across multiple network devices.

The CPU 1210 can have access to a memory 1250. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 1250 can include program memory 1260 that stores programs and software, such as an operating system 1262, Part Forecasting Platform 1264, and other application programs 1266. Memory 1250 can also include data memory 1270 that can include database information, etc., which can be provided to the program memory 1260 or any element of the device 1200.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, programmable consumer electronics, network PCs, minicomputers, mainframe computers, distributed computing environments that include any of the above systems or devices, or the like.

Figure 13:
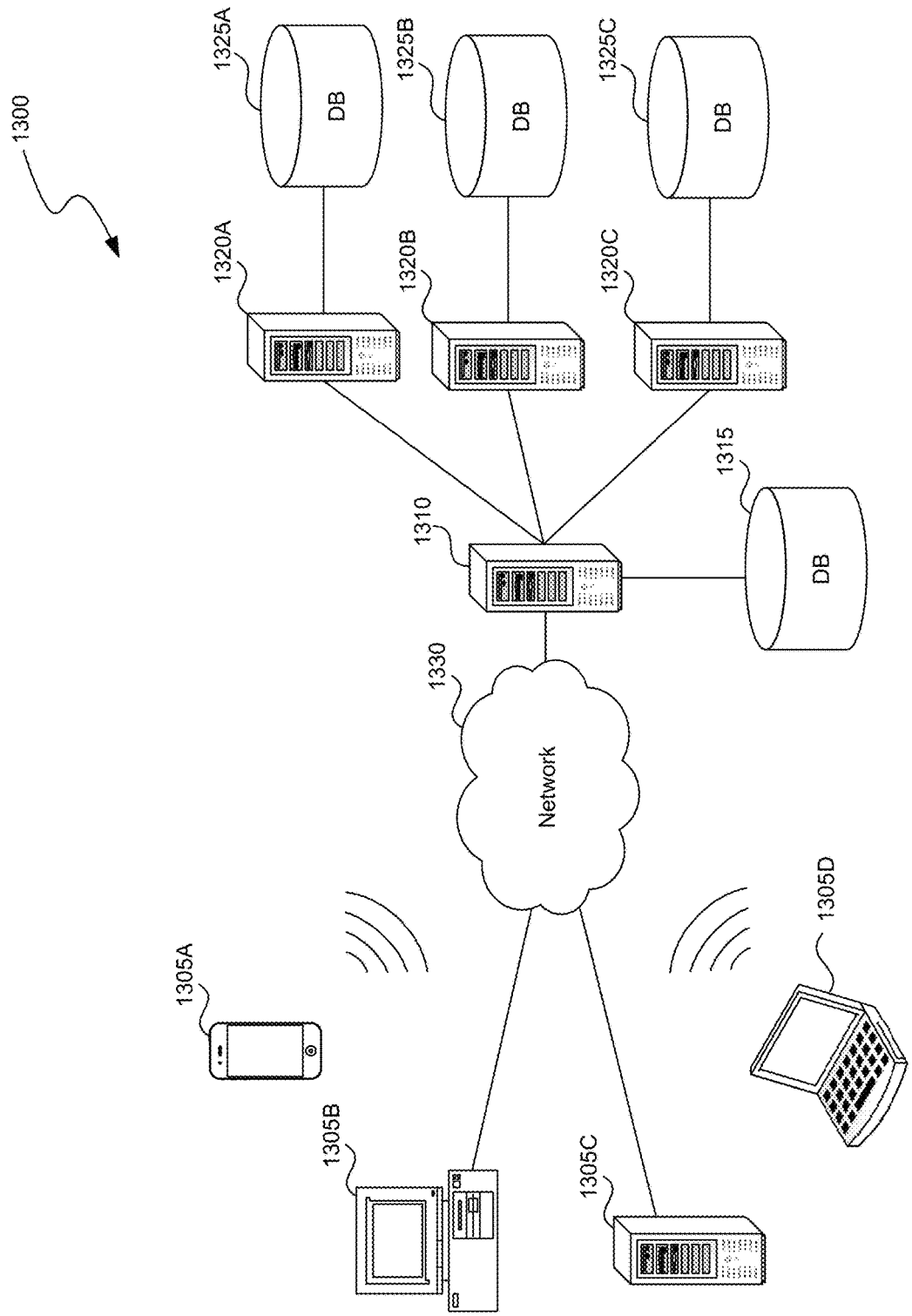
FIG. 13 is a block diagram illustrating an overview of an environment in which some implementations can operate.

FIG. 13 is a block diagram illustrating an overview of an environment 1300 in which some implementations of the disclosed technology can operate. Environment 1300 can include one or more client computing devices 1305A-D, examples of which can include device 1200. Client computing devices 1305 can operate in a networked environment using logical connections through network 1330 to one or more remote computers, such as a server computing device 1310.

In some implementations, server computing device 1310 can be an edge server that receives client requests and coordinates fulfillment of those requests through other servers, such as servers 1320A-C. Server computing devices 1310 and 1320 can comprise computing systems, such as device 1200. Though each server computing device 1310 and 1320 is displayed logically as a single server, server computing devices can each be a distributed computing environment encompassing multiple computing devices located at the same or at geographically disparate physical locations. In some implementations, each server computing device 1320 corresponds to a group of servers.

Client computing devices 1305 and server computing devices 1310 and 1320 can each act as a server or client to other server/client devices. Server 1310 can connect to a database 1315. Servers 1320A-C can each connect to a corresponding database 1325A-C. As discussed above, each server 1320 can correspond to a group of servers, and each of these servers can share a database or can have their own database. Databases 1315 and 1325 can warehouse (e.g., store) information. Though databases 1315 and 1325 are displayed logically as single units, databases 1315 and 1325 can each be a distributed computing environment encompassing multiple computing devices, can be located within their corresponding server, or can be located at the same or at geographically disparate physical locations.

Network 1330 can be a local area network (LAN) or a wide area network (WAN), but can also be other wired or wireless networks. Network 1330 may be the Internet or some other public or private network. Client computing devices 1305 can be connected to network 1330 through a network interface, such as by wired or wireless communication. While the connections between server 1310 and servers 1320 are shown as separate connections, these connections can be any kind of local, wide area, wired, or wireless network, including network 1330 or a separate public or private network.

Figure 14:
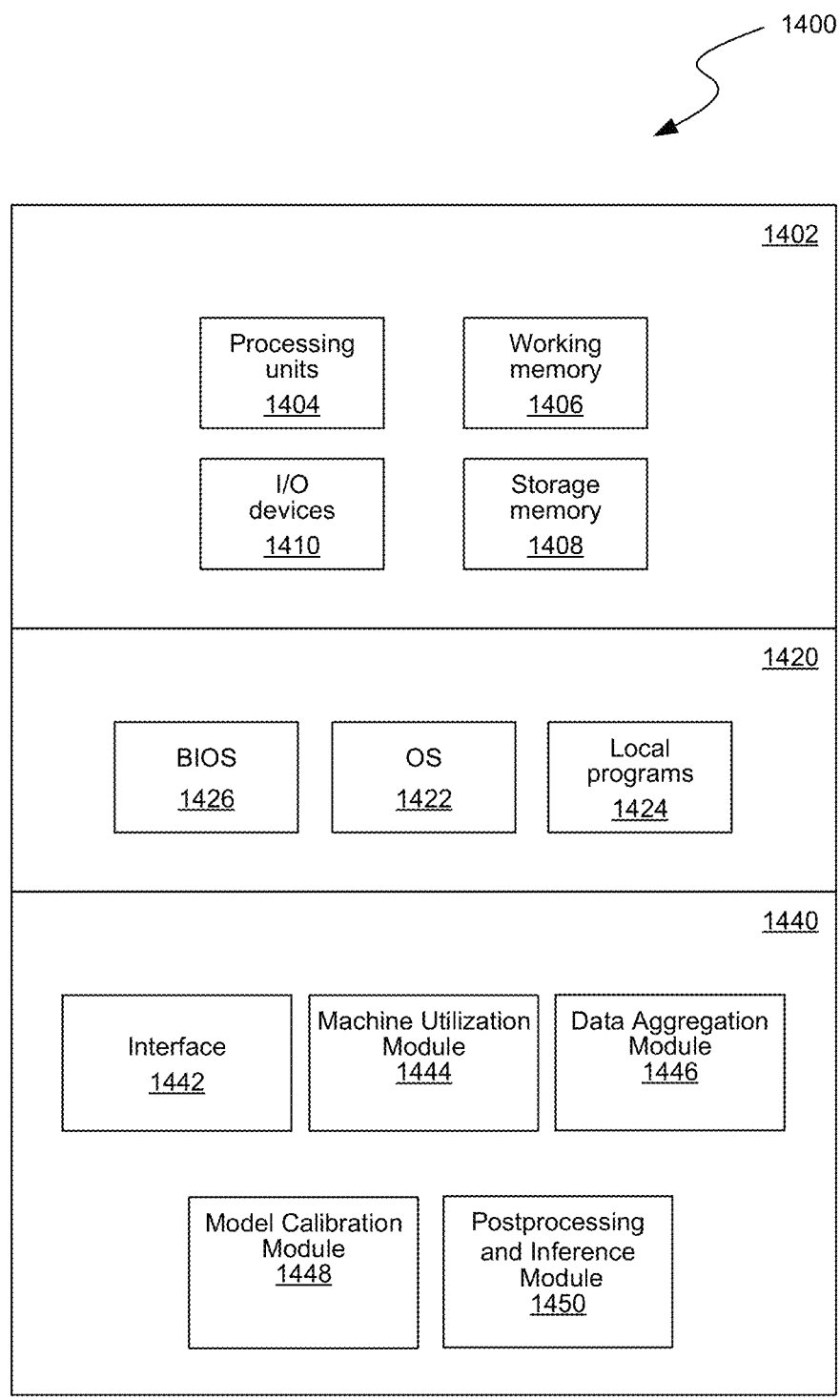
FIG. 14 is a block diagram illustrating components which, in some implementations, can be used in a system employing the disclosed technology.

FIG. 14 is a block diagram illustrating components 1400 which, in some implementations, can be used in a system employing the disclosed technology. The components 1400 include hardware 1402, general software 1420, and specialized components 1440. As discussed above, a system implementing the disclosed technology can use various hardware, including processing units 1404 (e.g., CPUs, GPUs, APUs, etc.), working memory 1406, storage memory 1408, and input and output devices 1410. Components 1400 can be implemented in a client computing device such as client computing devices 1305 or on a server computing device, such as server computing device 1310 or 1320.

General software 1420 can include various applications, including an operating system 1422, local programs 1424, and a basic input output system (BIOS) 1426. Specialized components 1440 can be subcomponents of a general software application 1420, such as local programs 1424. Specialized components 1440 can include a Machine Utilization Module 1444, a Data Aggregation Module 1446, a Model Calibration Module 1448, a Postprocessing and Inference Module 1450, and components that can be used for transferring data and controlling the specialized components, such as Interface 1442. In some implementations, components 1400 can be in a computing system that is distributed across multiple computing devices or can be an interface to a server-based application executing one or more of specialized components 1440.

Those skilled in the art will appreciate that the components illustrated in FIGS. 12-14 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described herein.

INDUSTRIAL APPLICABILITY

In some embodiments, a probabilistic part forecasting system can include a machine utilization module 1444, a data aggregation module 1446, a model calibration module 1448, and a postprocessing and inference module 1450 (FIG. 14). In operation, the machine utilization module 1444 can receive telematics data from one or more machines, such as excavators. The telematics data can include sensor data from the excavators, such as from pressure sensors, vibration sensors, and temperature sensors. The machine utilization module 1444 can determine a machine utilization pattern for the machines based on the telematics data. For example, a machine learning model can be applied to estimate each machine's utilization pattern based on the telematics data. The machine learning model can differentiate between, for example, mass excavation, dirt moving, trenching, scraping, grading, loading, tracking, or idle time. The resulting machine utilization patterns, or activity data, can be provided to the data aggregation module 1446.

The data aggregation module 1446 collects sales data for a part, or collection of parts, over a series of sales time periods and the activity data for a plurality of activity types over a series of activity time periods for a plurality of machines including the part to be forecast.

The model calibration module 1448 can calculate a mean activity time for each activity type for each time period in the series of activity time periods based on the collected activity data. The module further includes creating an activity probability density function of the mean activity times for each activity type and training a machine learning model using an expectation of activity derived from the probability density functions for each activity type and the collected sales data.

The postprocessing and inference module 1450 can feed machine activity data for a set of machines into the trained model to derive a part sales probability density function for the set of machines. The module can also calculate the model's accuracy and the model's sensitivity of parts sales with respect to each activity type. In some embodiments, the system can also distribute a quantity of the part to the geographic area of the machines based on at least the part sales probability density function for the set of machines. For example, the expected dollar value E, or corresponding quantity, of parts from the part sales probability density function can be shipped to the geographic area.

REMARKS

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for forecasting part sales for distributing machine parts, comprising:
    collecting, by at least one processor of a computing system communicatively coupled to a particular machine, sales data for a part over a series of sales time periods;
    using a set of machine sensors disposed on a plurality of machines comprising the particular machine, collecting machine sensor data over a series of activity time periods for the plurality of machines including the part;
    using a first machine learning model, the first machine learning model comprising a classification feature, determining, by the at least one processor, a machine utilization pattern based on automatically classifying the machine sensor data, the machine utilization pattern comprising activity data for a plurality of determined activity types over the series of activity time periods for the plurality of machines including the part,
        wherein a particular activity type in the plurality of determined activity types corresponds to a particular machine application inferred from the machine sensor data, and
        wherein the particular inferred machine application includes at least one of mass excavation or grading;
    calculating, by the at least one processor, a mean activity time for each determined activity type for each time period in the series of activity time periods based on the collected activity data;

generating, by the at least one processor, an activity probability density function of the mean activity times for each determined activity type;

determining, by the at least one processor, an expectation of activity from the activity probability density functions for each determined activity type in the machine utilization pattern;

training a second machine learning model using the determined expectation of activity from the probability density functions and the collected sales data;

using machine activity data for a set of machines in a particular geographic area, executing, by the at least one processor, the trained second machine learning model to derive a part sales probability density function for the set of machines in the particular geographic area; and distributing, to the particular geographic area, a quantity of the part determined based on the derived part sales probability density function for the set of machines.

2. The method of claim 1, wherein the sales time periods are months and the activity time periods are months.

3. The method of claim 1, further comprising calculating the second machine learning model's accuracy and the second machine learning model's sensitivity of parts sales with respect to each activity type.

4. The method of claim 3, wherein calculating the second machine learning model's sensitivity of parts sales with respect to each activity type comprises performing a Sobol sensitivity analysis to model normalized variance of conditional expectation of part sales with respect to each activity type.

5. The method of claim 1, wherein at least one of the first machine learning model or the second machine learning model comprises linear regression with sparse regularization.

6. The method of claim 1, wherein the determined activity type includes tracking.

7. The method of claim 1, wherein the first machine learning model comprises a neural network.

8. A part distribution system, comprising:
one or more processors; and
one or more memory devices having stored thereon instructions that when executed by the one or more processors cause the one or more processors to:
collect sales data for a part over a series of sales time periods;
using a set of machine sensors disposed on a plurality of machines and communicatively couped to the one or more processors, collect telematics data over a series of activity time periods for the plurality of machines including the part;
using a first machine learning model, the first machine learning model comprising a classification feature, determine a machine utilization pattern based on automatically classifying the telematics data, the machine utilization pattern comprising one or more activity types for each machine over the series of activity time periods,
wherein a particular activity type in the plurality of determined activity types corresponds to a particular machine application inferred from the telematics data, and
wherein the particular machine application includes at least one of mass excavation and grading;
calculate a mean activity time for each determined activity type for each time period in the series of activity time periods for the plurality of machines;

generate an activity probability density function of the mean activity times for each determined activity type;
determine an expectation of activity from the activity probability density functions for each determined activity type in the machine utilization pattern;
train a second machine learning model using the determined expectation of activity from the probability density functions and the collected sales data;
using machine activity data for a set of machines located in a geographic area, execute the trained second machine learning model to derive a part sales probability density function for the set of machines in the geographic area; and
send instructions to distribute a quantity of the part to the geographic area based on the part sales probability density function for the set of machines.

9. The system of claim 8, wherein the sales time periods are months and the activity time periods are months.

10. The system of claim 8, further comprising calculating the second machine learning model's accuracy and the second machine learning model's sensitivity of parts sales with respect to each activity type.

11. The system of claim 8, wherein at least one of the first machine learning model or the second machine learning model comprises linear regression with sparse regularization.

12. One or more non-transitory computer-readable media storing computer-executable instructions that, when executed by one or more processors, cause the one or more processors to perform operations comprising:
collecting sales data for a part over a series of sales time periods;
using a set of machine sensors disposed on a plurality of machines, collecting machine sensor data over a series of activity time periods for the plurality of machines including the part;
using a first machine learning model, the first machine learning model comprising a classification feature, determining a machine utilization pattern based on automatically classifying the machine sensor data, the machine utilization pattern comprising collecting activity data for a plurality of determined activity types over the series of activity time periods for the plurality of machines including the part,
wherein a particular activity type in the plurality of determined activity types corresponds to a particular machine application inferred from the machine sensor data, and
wherein the particular inferred machine application includes at least one of mass excavation or grading;
calculating a mean activity time for each determined activity type for each time period in the series of activity time periods based on the collected activity data;
generating an activity probability density function of the mean activity times for each determined activity type;
determining an expectation of activity from the activity probability density functions for each determined activity type in the machine utilization pattern;
training a second machine learning model using the determined expectation of activity from the probability density functions and the collected sales data;
using machine activity data for a set of machines in a particular geographical area, executing the trained second machine learning model to derive a part sales probability density function for the set of machines in the particular geographic area.

13. The non-transitory computer-readable media of claim 12, further comprising instructions to direct distribution of a quantity of the part to the geographic area based on the part sales probability density function for the set of machines.

14. The non-transitory computer-readable media of claim 12, wherein the sales time periods are months and the activity time periods are months.

15. The non-transitory computer-readable media of claim 12, further comprising instructions to calculate the second machine learning model's accuracy and the second machine learning model's sensitivity of parts sales with respect to each activity type.

16. The non-transitory computer-readable media of claim 15, wherein calculating the second machine learning model's sensitivity of parts sales with respect to each activity type comprises performing a Sobol sensitivity analysis to model normalized variance of conditional expectation of part sales with respect to each activity type.

17. The non-transitory computer-readable media of claim 12, wherein at least one of the first machine learning model or the second machine learning model comprises linear regression with sparse regularization.

\* \* \* \* \*